(12) United States Patent
Miles et al.

(10) Patent No.: US 9,091,774 B2
(45) Date of Patent: Jul. 28, 2015

(54) METHOD OF DETERMINING AN ELEMENT VALUE

(71) Applicant: Schlumberger Technology Corporation, Sugar Land, TX (US)

(72) Inventors: Jeffrey Miles, Arlington, MA (US); Robert Badry, Calgary (CA); James A. Grau, Marshfield, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 203 days.

(21) Appl. No.: 13/833,297

(22) Filed: Mar. 15, 2013

(65) Prior Publication Data

US 2014/0110575 A1 Apr. 24, 2014

Related U.S. Application Data

(60) Provisional application No. 61/709,836, filed on Oct. 4, 2012.

(51) Int. Cl.
*G01V 5/04* (2006.01)
*G01V 5/12* (2006.01)
*E21B 47/04* (2012.01)
*E21B 47/08* (2012.01)

(52) U.S. Cl.
CPC .............. *G01V 5/045* (2013.01); *E21B 47/04* (2013.01); *E21B 47/082* (2013.01); *G01V 5/125* (2013.01)

(58) Field of Classification Search
CPC ........ G01V 5/045; G01V 5/125; E21B 47/04; E21B 47/082

USPC ....................................................... 250/269.6
See application file for complete search history.

(56) References Cited

U.S. PATENT DOCUMENTS

| | | | | |
|---|---|---|---|---|
| 3,780,301 A | * | 12/1973 | Smith et al. | 250/301 |
| 4,661,701 A | * | 4/1987 | Grau | 250/269.6 |
| 4,697,650 A | | 10/1987 | Fontenot | |
| 7,366,615 B2 | | 4/2008 | Herron et al. | |
| 2003/0176973 A1 | * | 9/2003 | Hashem et al. | 702/13 |
| 2010/0025574 A1 | * | 2/2010 | Georgi et al. | 250/261 |

FOREIGN PATENT DOCUMENTS

| | | |
|---|---|---|
| EA | 12156 B1 | 8/2009 |
| RU | 2354998 C2 | 5/2009 |
| RU | 2431872 C2 | 6/2010 |

OTHER PUBLICATIONS

International Search Report and the Written Opinion for International Application No. PCT/US2013/063417 dated Feb. 6, 2014.

* cited by examiner

*Primary Examiner* — David Porta
*Assistant Examiner* — Mindy Vu
(74) *Attorney, Agent, or Firm* — Cathy Hewitt; Michael Dae

(57) ABSTRACT

A method of analyzing a geologic formation having a borehole therein may include operating at least one tool within the borehole to collect respective borehole dimensions at different depths in the borehole, and collect respective total values for a given element at the different depths in the borehole. Each total value may be based upon both a value for an adjacent portion of the geologic formation and a value for material within the borehole. The method may also include determining each value of the given element in the adjacent portion of the geologic formation based upon the total value and the corresponding borehole dimensions.

20 Claims, 9 Drawing Sheets

METHOD OF DETERMINING AN ELEMENT VALUE

RELATED APPLICATION

This application claims the benefit of a related U.S. Provisional Application Ser. No. 61/709,836, filed Oct. 4, 2012, entitled "METHOD OF CORRECTING FOR THE CONTENTS OF A BOREHOLE IN GAMMA-RAY SPECTROSCOPY," the disclosure of which is incorporated by reference herein in its entirety.

BACKGROUND

Various neutron-gamma spectroscopy techniques are based on the use of neutrons to create excited states in a nucleus which then decays via emission of one or more gamma-rays. The gamma-rays of each isotope have a characteristic energy spectrum which may be used to distinguish an elemental concentration.

The neutrons can be generated either by isotopic sources like $^{241}$AmBe or $^{252}$Cf, or alternatively by an electronic neutron generator. The neutron generator may use the d-T reaction for the neutron generation, but other neutron reactions may be used. The neutron generator may be pulsed, i.e., it emits bursts of neutrons in a defined sequence. This may allow it to distinguish between capture and inelastic gamma-rays and may make it possible to determine additional quantities of interest, such as, for example, slowing down time, the geologic formation or borehole thermal neutron capture cross section, geologic formation bulk density (neutron-gamma density), and others.

Gamma-rays may be detected in gamma-ray detectors spaced away from the neutron generator. These gamma-ray detectors measure the spectrum of gamma-ray energies deposited in the detector material. Suitable detectors may be scintillation detectors or other gamma-ray detectors that have a desired detection efficiency and spectral performance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method of analyzing a geologic formation having a borehole therein may include operating at least one tool within the borehole to collect respective borehole dimensions at a plurality of different depths in the borehole, and collect respective total values for a given element at the plurality of different depths in the borehole. Each total value may be based upon both a value for an adjacent portion of the geologic formation and a value for material within the borehole. The method may also include determining each value of the given element in the adjacent portion of the geologic formation based upon the total value and the corresponding borehole dimensions.

A system for analyzing a geologic formation having a borehole therein may include at least one tool to be positioned within the borehole to collect respective borehole dimensions at a plurality of different depths in the borehole, and to collect respective total values for a given element at the plurality of different depths in the borehole, each total value being based upon both a value for an adjacent portion of the geologic formation and a value for material within the borehole. The system may also include a controller to determine each value of the given element in the adjacent portion of the geologic formation based upon the total value and the corresponding borehole dimensions.

A non-transitory computer-readable medium for analyzing a geologic formation may have computer-executable instructions configured to perform operations that may include determining each value of a given element in an adjacent portion of the geologic formation based upon a total value collected for the given element from a tool operated within the borehole at different depths in the borehole and corresponding borehole dimensions collected from the tool at the different depths in the borehole. Each total value may be based upon both a value for an adjacent portion of the geologic formation and a value for material within the borehole.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
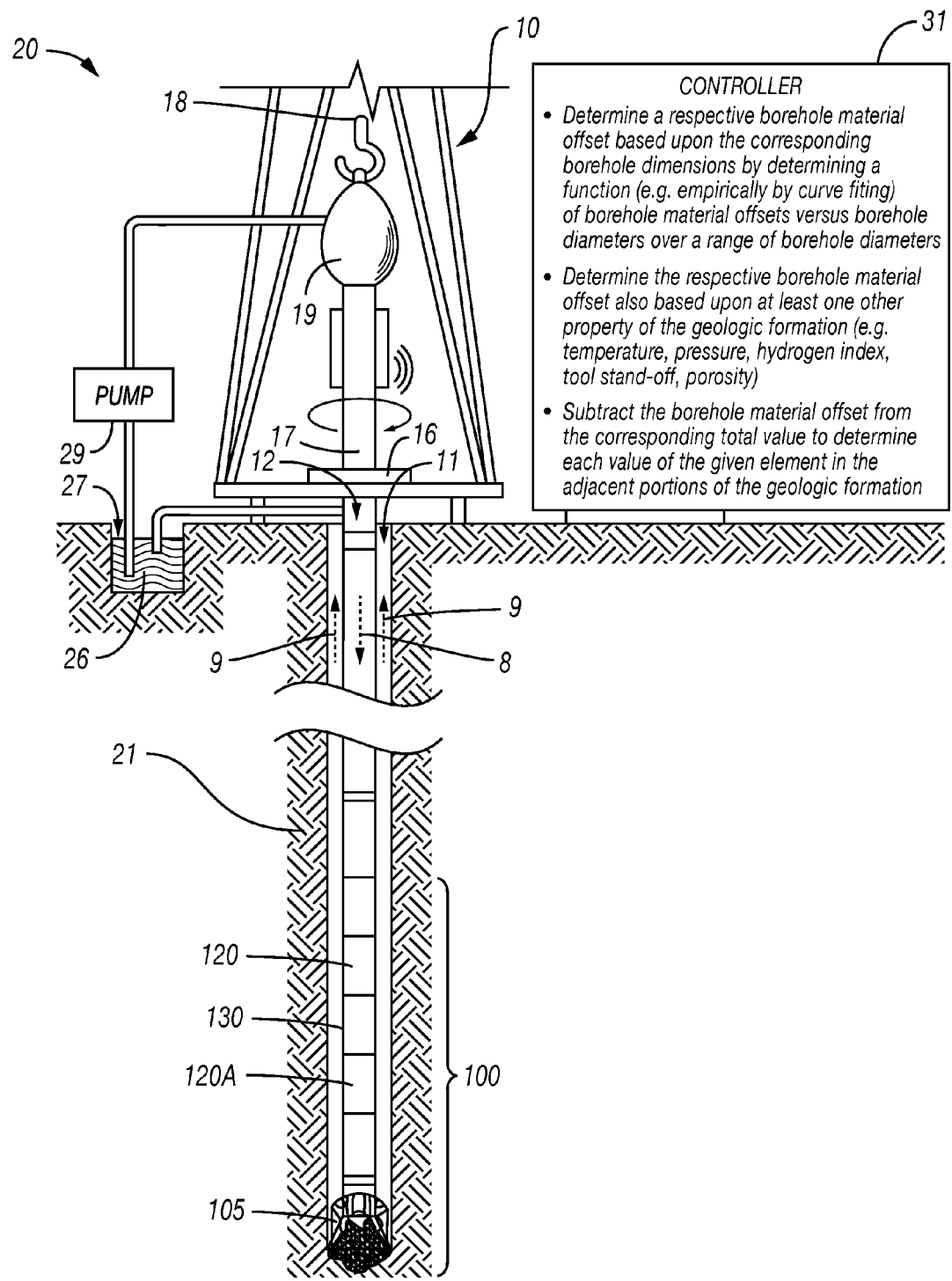
FIG. 1 is a schematic diagram of a subterranean a well logging system for use with a method in accordance with an embodiment.
Figure 2:
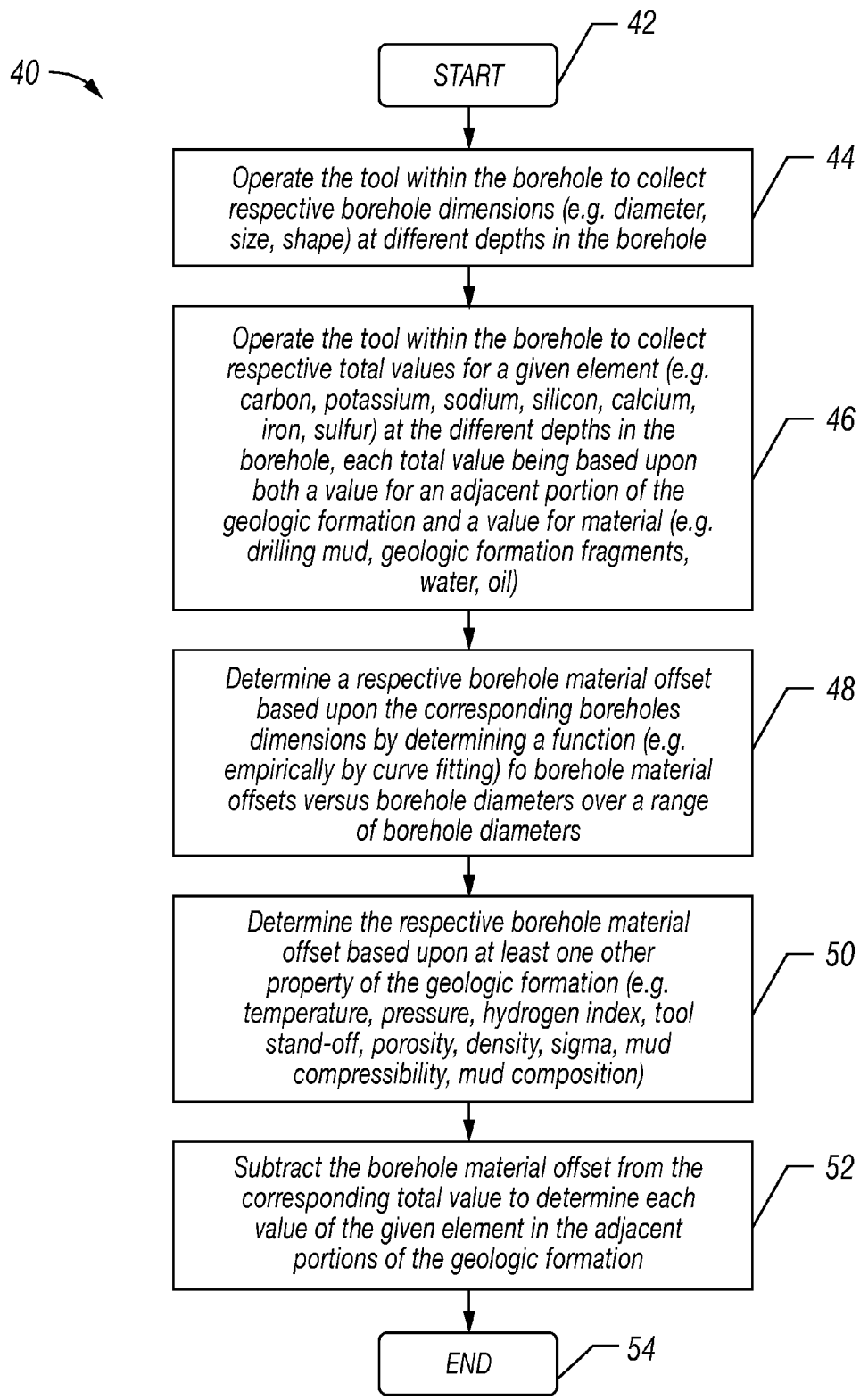
FIG. 2 is a flowchart of a method of analyzing a geologic formation in accordance with an embodiment.

Referring initially to FIG. 1, and the flowchart 40 in FIG. 2, a system 20 and corresponding method of analyzing a geologic formation 21 is described. The wellsite system 20 may be onshore or offshore, for example. A borehole 11 is formed in the geologic formation 21, for example, by rotary drilling. Of course, the borehole 11 may be formed in the geologic formation 21 using other techniques, for example, directional drilling.

A drill string 12 is suspended within the borehole 11 and has a bottom hole assembly 100 or tool which includes a drill bit 105 at its lower end. The system 20 includes a platform and derrick assembly 10 positioned over the borehole 11. The assembly 10 includes a rotary table 16, a kelly 17, a hook 18, and a rotary swivel 19. The drill string 12 is rotated by the rotary table 16 and energized to engage the kelly 17 at the upper end of the drill string. The drill string 12 is suspended from the hook 18, attached to a traveling block, through the kelly 17 and the rotary swivel 19 which permits rotation of the drill string relative to the hook. A top drive system could alternatively be used.

Drilling fluid or mud 26 may be stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole 11, as indicated by the directional arrows 9. The drilling fluid lubricates the drill bit 105 and carries subterranean formation cuttings to the surface to be returned to the pit 27 for recirculation.

The bottom hole assembly 100 or tool includes a logging-while-drilling (LWD) module 120, a measuring-while-drilling (MWD) module 130, a roto-steerable system and motor, and drill bit 105. The LWD module 120 is carried by a drill collar and may include one or more logging tools. Of course, more than one LWD and/or MWD module may be used, for example, as illustrated. It should be noted that references made herein to a module at the position 120 may alternatively correspond to a module at the position of 120A. The LWD module 120 includes capabilities for measuring, processing, and storing information, and for communicating with the surface equipment. For example, the LWD module 120 may include a borehole dimension measuring device and an element value measurement device.

The MWD module 130 is also carried by a drill collar, and may include one or more devices for measuring characteristics of the drill string and drill bit. The MWD tool or module 130 may further include a device for generating electrical power to the downhole system, for example, a mud turbine generator powered by the flow of the drilling fluid. Of course, other types of power and/or battery systems may be used. The MWD module 130 may include one or more of the following types of measuring devices: a weight-on-bit measuring device, a torque measuring device, a vibration measuring device, a shock measuring device, a stick slip measuring device, a direction measuring device, and an inclination measuring device.

Measurements from the measuring devices of the LWD and/or MWD modules 120, 130 may be sent, for example, wirelessly via wireless communications circuitry, to the surface for processing. For example, a controller 31 may control and log the measurements. The controller 31 may be in the form of one or more processors and a memory coupled thereto, and may include a database, for example. While a particular tool 100 has been described herein, it should be appreciated that a tool may include more or less components described above.

Beginning at Block 42, the tool 100 is operated in the geologic formation 21, and more particularly, the borehole 11, to collect respective borehole dimensions at different depths in the borehole (Block 44). For example, the tool 100 may be operated to collect to a diameter or size of the borehole and/or a shape of the borehole at different depths.

The tool 100 is also operated within the borehole 11 to collect respective total values for a given element, for example, carbon, at the different depths in the borehole (Block 46). Each total value may be based upon both a value for an adjacent portion of the geologic formation 21 and a value for a material within the borehole 11, for example, drilling mud, fragments of the geologic formation, water, and oil. Of course, other or additional materials may be within the borehole 11. Moreover, while the borehole dimensions and the total values have been collected from the tool 100 it will be appreciated that the borehole dimensions and total values may be collected from more than one tool in the borehole 11 or other types of tools.

One technique for measuring and processing collected values to provide an amount or concentration of a given element involves nuclear spectroscopy thermal capture measurements, whereby a tool, for example, as described above including a source and a detector may be lowered into the borehole 11 in the geologic formation 21. The geologic formation 21 is bombarded with fast neutrons, typically from a minitron or an AmBe source. The fast neutrons collide with other particles and lose energy in the process. At thermal energies, when the neutrons collide with the nuclei of certain atoms, there is a given probability that they are captured to create a heavier isotope in an excited state. Within a relatively small fraction of a second, the excited nucleus emit gamma rays of energies that are characteristic of the specific element. A spectroscopy detector and electronics acquire the total spectrum of gamma ray energies. The acquisition of the data may be segmented in short time intervals that are related to depth intervals. The spectrum of a traditional capture measurement is analyzed using a set of pre-defined elemental standard spectra to obtain the relative contributions ("yields") of each element. Elements typically included in a capture spectrum may be, for example, Si, Ca, Fe, S, Ti, Gd, H, Cl, tool background metals, and sometimes Al, K, Na, Mg, Mn, Ni, Ba, plus additional minor or trace elements. A basic analysis of capture data assumes that some elements (for example, Si, Ca, Fe, S, Ti, Gd, Mg, Al, K, Na) are associated with dry rock, while other elements (for example, H, Cl, and various metals) are associated with fluids or tool background and can be discarded. The dry rock elements are analyzed to estimate elemental concentrations, lithology, and rock matrix properties, for example.

Another technique for measuring and processing collected values to provide an amount or concentration of a given element includes nuclear spectroscopy inelastic measurements, whereby a tool, for example, as described above, including a source and a detector are lowered into the borehole 11. Relatively high energy neutrons (for example 14 MeV), typically produced by a minitron pulsed neutron generator, bombard the geologic formation and scatter off or react inelastically or make fast-neutron reactions such as (n,p) or (n,α) with the nuclei of atoms, creating gamma rays of characteristic energies when certain isotopes are involved. These inelastic gamma rays may be released relatively promptly within a relatively small fraction of a second.

As described above, nuclear tools collect and analyze gamma-ray energy spectra. The spectrum of a traditional inelastic measurement may be analyzed using a set of pre-defined elemental standard spectra to obtain the relative contributions ("yields") of each element. Elements typically included in an inelastic spectrum include C, O, Si, Ca, Mg, S, Fe, but analysis is typically not limited to these elements. A common application for inelastic spectroscopy data is to use a carbon-to-oxygen ratio to estimate formation fluid saturation. The measurement can be accomplished with a single gamma-ray spectroscopy detector. However, the use of multiple detectors may allow the influence of the borehole fluid to be compensated or may improve the statistical precision of the measurement. An example of a spectral, multi-detector carbon/oxygen tool the Reservoir Saturation Tool (RST™) available from Schlumberger Technology Corporation of Sugar Land, Tex.

Yet another technique for measuring and processing collected values to provide an amount or concentration of a given element is a joint analysis of inelastic and capture measurements. The inelastic measurement also may be normalized to thermal-capture measurements using one or more elements that the two spectra share in common to provide formation weight concentrations for elements of the inelastic spectrum. This may be useful because the inelastic measurement includes elements such as C and Mg for which the capture measurement has virtually no sensitivity (carbon) or is much less precise (Mg). The normalization method using the common element silicon is described in U.S. Pat. No. 7,366,615 to Herron et al., assigned to the present assignee, and the entire contents of which are herein incorporated by reference. An example of a tool that uses this latter method is the Litho Scanner™ available from Schlumberger Technology Corporation of Sugar Land, Tex. Furthermore, once the inelastic spectrum is used to extract the total weight concentration of carbon, for example, in the geologic formation 21, the inorganic carbon of the geologic formation can be inferred from the capture analysis of mineralogy. The total organic carbon (TOC) of the geologic formation 21 therefore is the difference between the total carbon from inelastic and the total inorganic carbon (TIC) from capture:

$$TOC=Total\ Carbon-TIC \tag{1}$$

This weight concentration of total organic carbon can represent kerogen, bitumen, or any hydrocarbon in the geologic formation 21, for example, and may be a relatively valuable indicator of reservoir quality.

Regardless of whether the measurement is based on inelastic or capture spectroscopy or the combined analysis of both, the total measured spectrum is a combination of gamma-rays from the dry rock as well as from pore fluids, the contents of the borehole 11, and the tool, for example, the tool 100. In spectroscopy, a typical goal is to analyze the geologic formation 21. For an increased accuracy analysis, it may be desirable that spectral yields from undesirable sources such as the borehole 11 are reduced, removed, or accounted for. This may be of particular interest as the borehole contribution may vary at different depths. Two methods may be used that account for variable contributions from elements in the borehole. One method involves completely excluding an element in the borehole 11 from the rock analysis because it is assumed to be absent from the rock. For example, H and Cl are typically present in the fluids of the borehole 11 and pore space, but presumably not in dry rock within the geologic formation 21. These spectral yields are discarded, and the yields of the dry rock elements are analyzed separately.

Another method involves uniquely associating an element in the borehole 11 that is also present in the rock, with another non-rock element. For example, sulfur may be present in some rock minerals, but it may also occur in barite-weighted drilling mud. The "mud sulfur" may be associated with the unique element Ba from barite, for example, in a proportional amount, and that amount of S may be subtracted from the total measured S to infer the rock sulfur.

However, when an element is present in both the borehole drilling fluid and in the rock, it may not be excluded completely, but neither can the borehole component be uniquely associated with another element to be subtracted. For example, when oil-based mud is used as the drilling fluid, the total measured carbon of the inelastic spectrum has contributions from the borehole carbon and the organic and inorganic carbon of the geologic formation 21. The previous description of the total organic carbon (TOC) calculation thus breaks down.

A controller 31 determines each value of the given element in the adjacent portion of the geologic formation 21 based upon the total value and the corresponding borehole dimension. In some embodiments, the controller 31 may be located above the geologic formation 21 and may receive, for example, wirelessly or via a wireline, the collected dimensions and total values from the tool 100. In other embodiments, the controller 31 may be collocated with the tool 100 or carried by the tool housing.

The controller 31 determines each total value of the given element in adjacent portions of the geologic formation 21 by determining a respective borehole material offset (Block 48) based upon the corresponding borehole dimensions. More particularly, the controller 31 determines each total value of the given element by determining a function, for example, empirically by curve fitting, of borehole material offsets versus borehole diameters over a range of borehole diameters. The controller 31 may also determine the borehole material offset also based upon at least one other property of the geologic formation 21, for example, a temperature, a pressure, a hydrogen index, a tool stand-off, a porosity, a density, a macroscopic thermal neutron capture cross-section (sigma), a mud compressibility, and a mud composition (Block 50). Of course, the controller 31 may also determine the borehole material offset also based upon other and/or additional properties of the geologic formation 21, or in some embodiments, no additional properties may be used to determine the borehole material offset. Further details of determining the borehole material offset based upon the other properties are described below.

The method also includes, at Block 52, subtracting the borehole material offset from the corresponding total value to determine each total value of the given element in adjacent portions of the geologic formation 21. The method ends at Block 54.

Thus, the organic carbon may be more correctly be calculated from:

$$TOC=Total\ Carbon-Total\ Inorganic\ Carbon\ (TIC)- \\ Borehole\ Carbon \tag{2}$$

Figure 3:
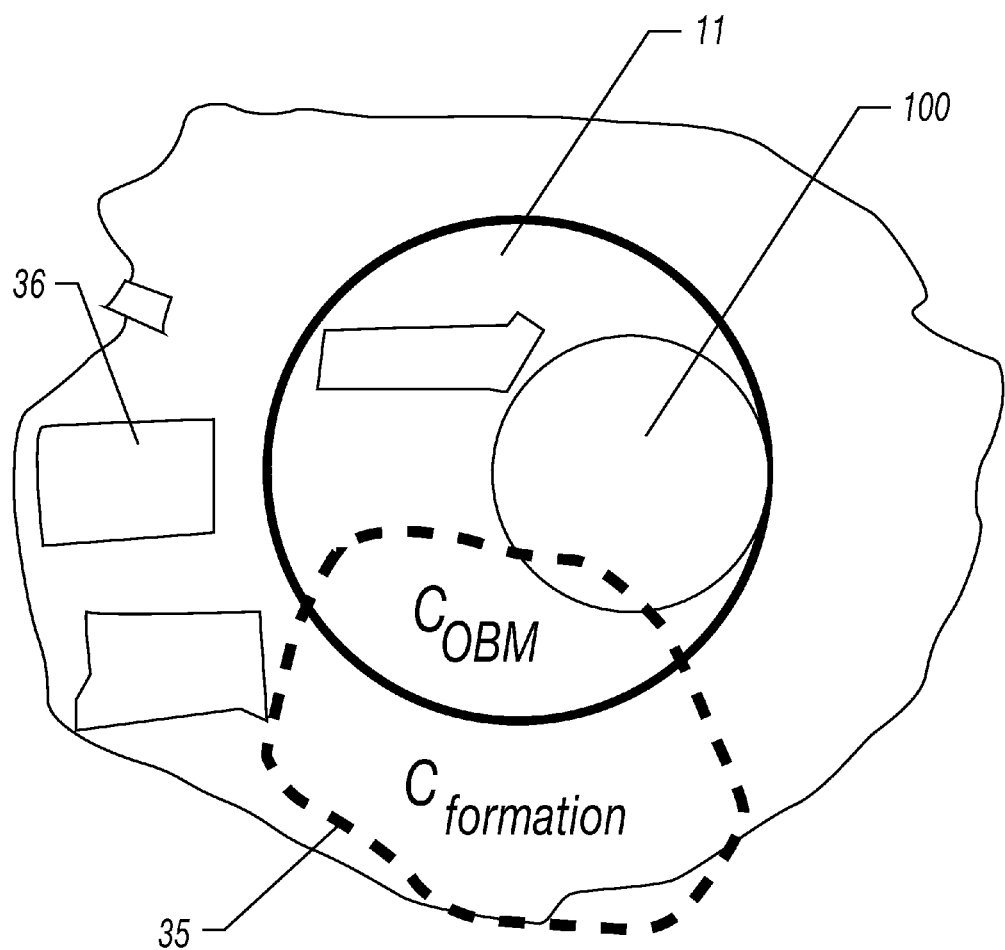
FIG. 3 is schematic diagram illustrating total organic carbon including organic carbon from oil-based mud and from the geologic formation.

This situation is illustrated schematically in FIG. 3, for the oil-based mud case, showing the TOC 35 resulting from the TIC 36 and the borehole carbon being subtracted from the total carbon, wherein $C_{OBM}$ denotes carbon from oil based mud and $C_{formation}$ denotes carbon from the geologic formation 21. Additionally, the tool 100 may also be a relatively small source of background carbon (primarily from the rubber shielding, for example) which is desirable to also be subtracted from the total and which can be grouped into the term "borehole carbon."

A conventional approach is to subtract a constant amount of carbon from the total to account for the borehole component, whether it is from the tool 100 or from the mud. Specifically, this may be implemented as a fixed offset in the relative spectral yield for carbon, where the offset is chosen manually by the log analyst based on characteristics of the total well dataset. Such constant offsets may be applied to account for borehole contributions for other elements, such as, for example, Si, Ca, and Mg. For any element i, the adjusted formation yield may be:)

$$Y_i^{formation}=Y_i^{total}-\delta_i \tag{3}$$

where $\delta_i$ is the manually picked constant offset and $Y_i$ is the total measured or adjusted formation yield.

In the case of the conventional TOC analysis, the value of the carbon yield offset may be chosen to set the minimum value of TOC in the well to be statistically relatively consistent with zero. This choice may be based on the logic that there is probably a formation zone of zero organic content in a well of sufficient length, and the true organic content cannot be a negative number.

Figure 4:
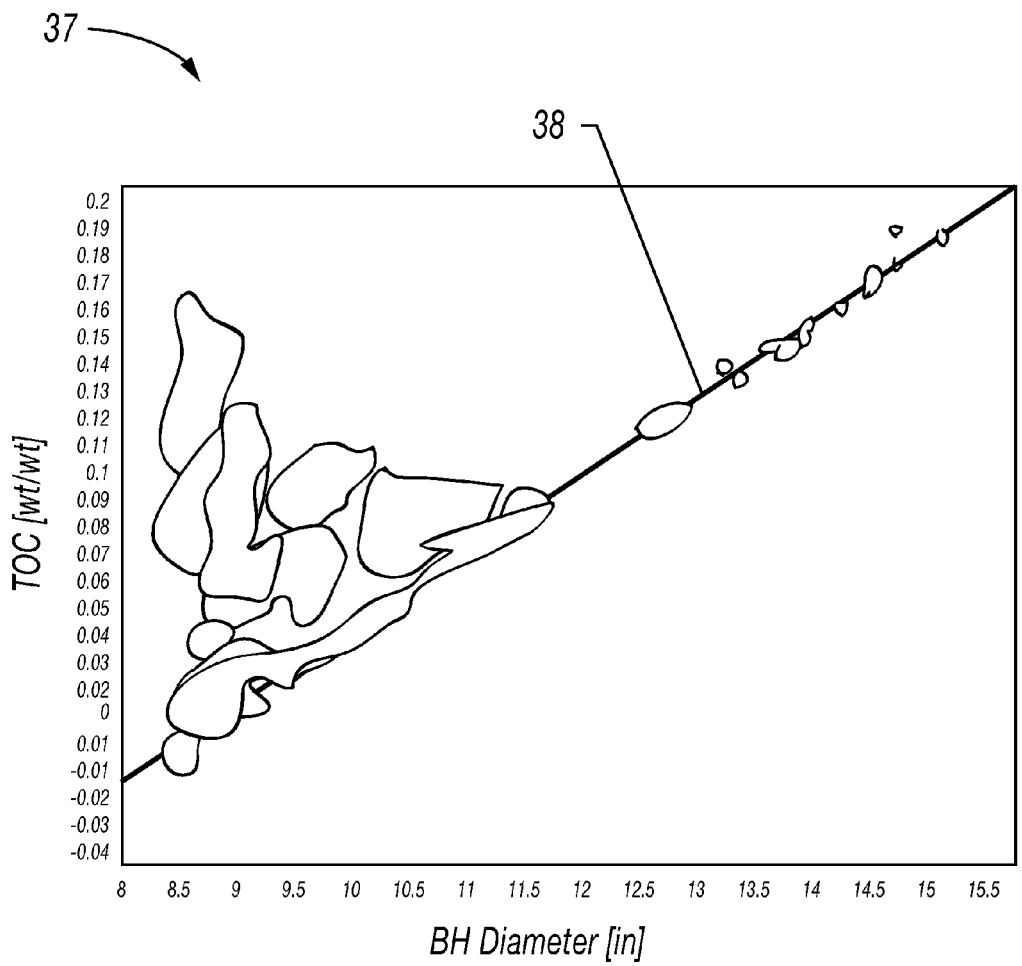
FIG. 4 is a graph correlating borehole diameter to total organic carbon in accordance with an embodiment.

Despite being relatively tedious and error-prone due to its manual nature, this conventional method of borehole correction may be increasingly accurate as long as the logging environment is fairly constant. However, changes in the borehole 11 and geologic formation environment cause the relative yield of borehole elements to change. For example, if washouts or drill bit changes cause the diameter of the borehole 11 to change, the spectral contribution of organic carbon from oil-based mud (OBM) also changes. The above conventional method of constant offsets does not address this situation, and the resulting accuracy of the analysis of the geologic formation 21 also suffers. The graph 37 in FIG. 4, illustrates the correlation between borehole diameter and the apparent TOC that results from the constant-offset method for carbon in a well drilled with OBM. The large non-zero values of apparent TOC for the enlarged borehole points likely do not represent real organic-rich geologic formations. Rather, these relatively large non-zero values of apparent TOC show an excess of carbon yield that is being contributed by the oil-based mud for large boreholes. The line 38 is drawn as a guide for the minimum value of TOC at each borehole diameter.

Other properties or variables other than the size, and more particularly, the diameter, of the borehole 11 can cause such changes. For example, borehole shape, tool stand-off from the geologic formation 21, geologic formation porosity, hydrogen index or density, the density and composition of the borehole fluid, and the salinity of the borehole and formation fluids may also cause such changes. Accordingly, as noted above with respect to Block 50, the total value of the given element may be determined using the controller 31, e.g. carbon, in the adjacent portions of the geologic formation 21 based upon one or more other properties, for example, those described above. Of course, other and/or additional properties may be considered when determining the total value of the given element.

It should be noted that while the TOC analysis has been described with particular regard to the variable contribution from OBM carbon, it will be appreciated that the analysis may be applicable to any element that is present in both the geologic formation 21 and the in the borehole 11. For example, the given element or borehole-contaminated element may include one or more of carbon from the OBM or the tool background, drilling mud, geologic formation fragments, and/or water. In particular, the given element may include any element from solid weighting agents in the mud or geologic formation drilling cuttings: e.g., Si, Ca, Fe, S, C, Al, etc., any element from drilling mud additives: e.g., lignite, inhibitors, etc., and any element bonded ionically in saline brines: Na, K, Ca, etc. Of course other and/or additional elements may be present in the borehole 11 and be considered for their contribution.

Further details of the above-described method, for example, embodiments with respect to implementation, are now described. In one embodiment, each value of the given element in the adjacent portion of the geologic formation 21 is based upon the total value and the corresponding borehole dimensions using computer modeling.

As noted above, the yield contributed by carbon in the borehole 11 varies based on borehole size and other conditions, and the appropriate amount of the total measured carbon is to be subtracted to arrive at an accurate formation total organic carbon (TOC). In the computer modeling embodiment, the borehole carbon yield for a variety of logging environments is extracted, for example, based upon previously collected borehole dimensions and total values, and an algorithm is generated based on the results. For example, one such algorithm has the form:

$$f(D_{BH}, so, HI) = c_1 + c_2(D_{BH} - 4.5) + \quad (4)$$
$$(c_3 + c_4(D_{BH} - 4.5)) \cdot (1 - \exp(-so/c_5)) + c_6(1 - \exp(-HI/c_7))$$

where f is the variable carbon yield from the borehole and is a function of the circular borehole diameter $D_{BH}$, the tool stand-off so, and the geologic formation hydrogen index HI. The coefficients $c_j$ can be fitted in a database of modeled points stored in a memory coupled to the controller 31, for example, with the values shown below in Table 1. Table 1 includes coefficients of the example algorithm for borehole carbon relative yield in equation 4, for input environmental variables borehole size and stand-off in units of inches and HI as a fraction.

TABLE 1

| Coefficient | Value | Units |
|---|---|---|
| $c_1$ | −0.000537073 | — |
| $c_2$ | 0.0123112 | 1/inch |
| $c_3$ | −0.0127562 | — |
| $c_4$ | 0.00790615 | 1/inch |
| $c_5$ | 3.36595 | inch |
| $c_6$ | 0.00338434 | — |
| $c_7$ | 0.167443 | — |

Such an algorithm for the borehole carbon yield may be used to improve on the constant-offset correction of equation 3 by substituting the variable borehole contribution in place of the constant value such that:

$$Y_i^{formation} = Y_i^{total} - f(D_{BH}, so, HI) \quad (5)$$

where element i represents organic carbon. The resulting organic carbon yield can be converted into the weight concentration of TOC in the geologic formation 21.

Figure 5:
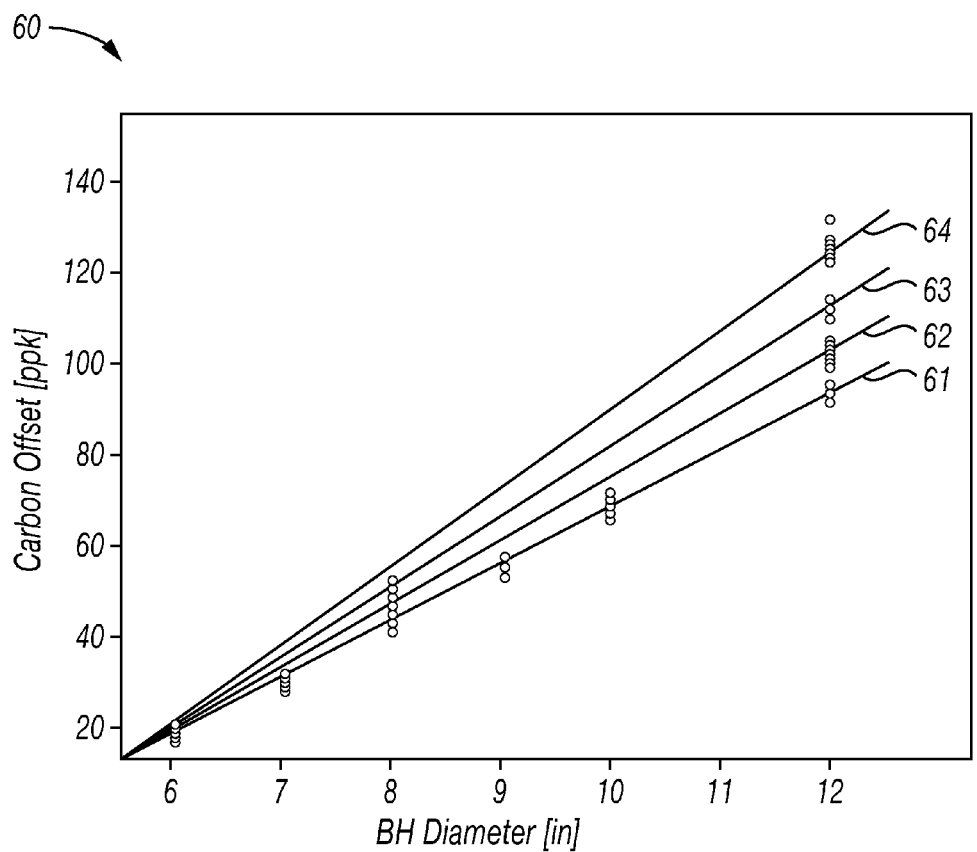
FIG. 5 is a graph corresponding to an algorithm derived for performing the method according to an embodiment.

This example is based on a modeled database of 192 logging environments covering variation of borehole diameter, tool stand-off, geologic formation porosity, and geologic formation water salinity. The graph 60 in FIG. 5 shows the variation of the borehole carbon yield for these points, plotted against borehole diameter at different tool stand-off. Line 61 corresponds to tool stand-off, which lines 62, 63, and 64 correspond to tool stand-offs of 0.75 inches, 1.75 inches, and 3.75 inches respectively. In each case the oil-based mud is modeled to be diesel fuel. This latter assumption underscores a basic flaw in the pure-modeling approach: the carbon content of oil-based mud varies widely in the field (in the form of oil fractions ranging from 50% to nearly 100%). Different mud compositions produce different coefficients in an algorithm like the one above. If, for example, the wrong mud composition is assumed for the modeling algorithm, the borehole carbon correction may be increasingly inaccurate. The mud composition could be made a manual input of a more complex algorithm, but mud specifications reported from the well site may be unreliable. These difficulties of mud composition are described in further detail below. As will be appreciated, a pure modeling algorithm may be derived for any other element of the mud.

In yet another embodiment, following the same concept as the pure-modeling approach above, the controller 31 may determine each value of the given element in the adjacent portion of the geologic formation based upon the total value and the corresponding borehole dimensions using a borehole correction algorithm derived exclusively from real measurements in the laboratory and/or in field tests. The data may be compiled by performing the manual method of constant offset picking for various wells where the borehole diameter (or any other aspect of the logging environment) has a known value, and storing these offset and environment values. The resulting data may be used to derive a function that captures the environmental dependences.

Figure 6:
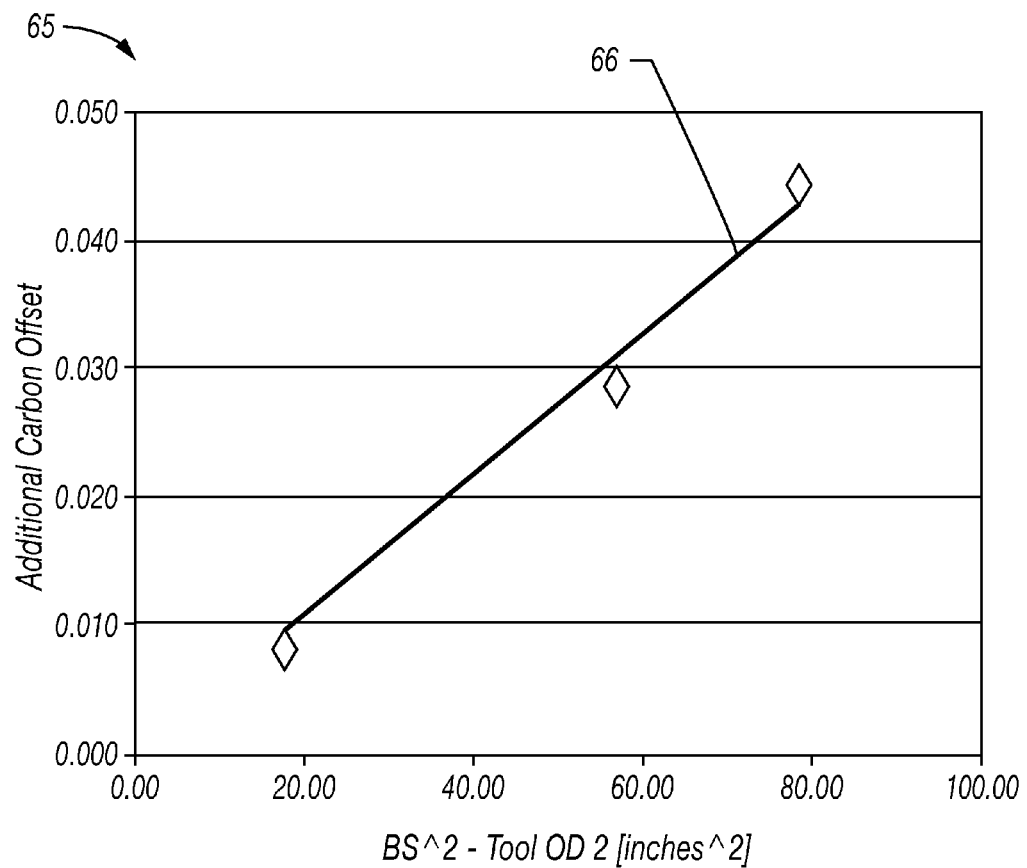
FIG. 6 is a graph illustrating an example of a linear algorithm for the borehole carbon relative yield in accordance with an embodiment.

The resulting function may be applied to compensate the formation yield, just as in the format of equation 5 (but possibly with different environmental inputs). The graph 65 in FIG. 6 illustrates an example of a relatively simple linear function for the borehole carbon yield offset fitted against the cross sectional area of the borehole drilling mud (illustrated by the line 66).

This approach, however, may suffer from the same flaw as the pure modeling approach above in that the carbon content of oil-based mud varies widely in the field. Therefore, it may be desirable that the carbon content or oil fraction of the mud be an input to the algorithm to produce a more accurate borehole correction. These difficulties of mud composition are addressed in further detail below.

In an embodiment, the borehole correction is inferred using the data in the same well where the correction is desired. In this sense, the correction is "self-calibrating", which helps to address the wide variation in mud composition, which may pose a challenge for the above-described methods. It may also help to address environmental factors, which may not be well-measured in some datasets, for example, tool position, tool stand-off, and relatively complex hole shapes.

Figure 7:
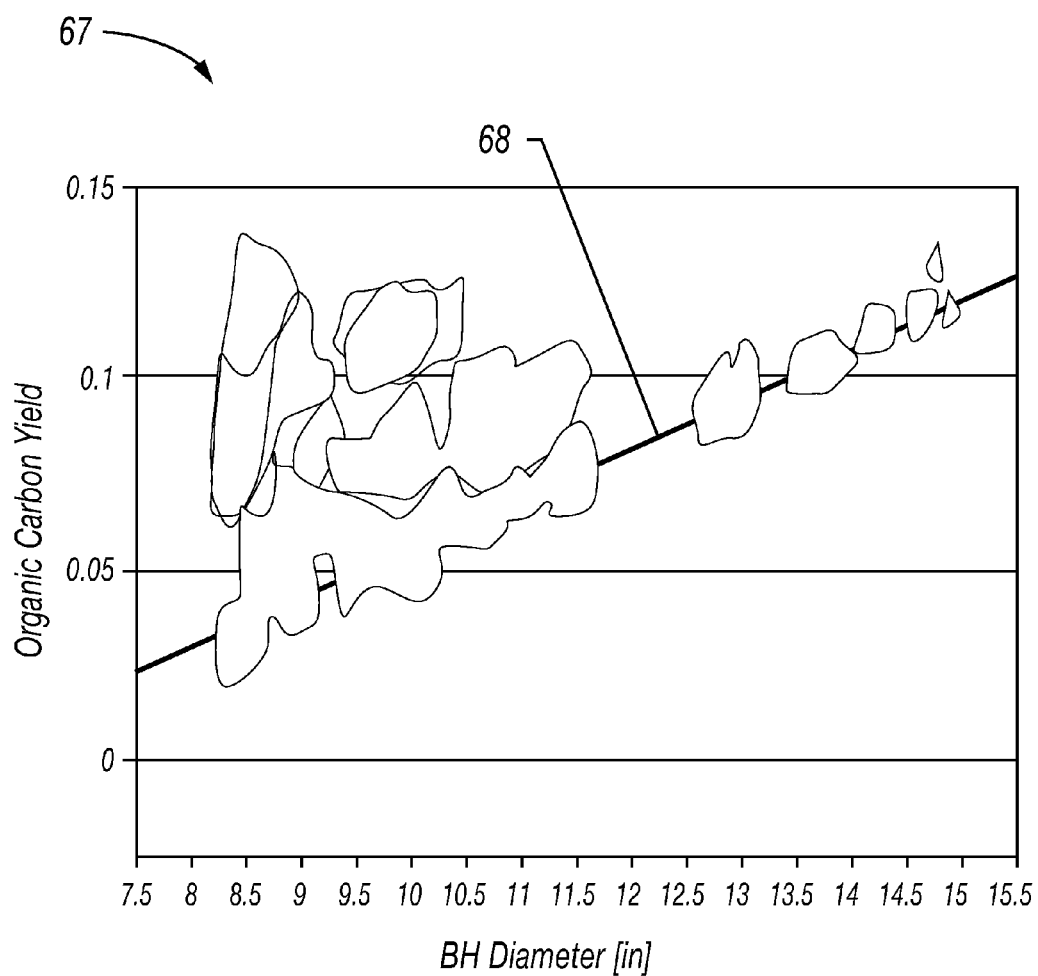
FIG. 7 is a graph correlating borehole diameter to organic carbon yield in accordance with an embodiment.

In this approach, the spectral yield of the borehole-contaminated element is examined against one or more environmental variables of interest, for all or part of the depth interval covered by the well. The graph 67 in FIG. 7 illustrates an example where the "organic carbon yield" (the relative yield of carbon which would be assigned to organic carbon in the existing constant-offset method) is plotted against a measurement of borehole diameter at each corresponding depth, for the entire well. The graph 67 in FIG. 7 shows a relatively large increase in the minimum organic carbon yield at each increasing value of borehole diameter. This increase may be based upon the contribution of carbon from the oil-based mud in the borehole 11, and may not be due to real organic carbon in the geologic formation 21. The correction for the presence of borehole carbon may be inferred from the aggregate dataset by fitting a line 68 (or any other suitable function) along the bottom of the cloud of data points. While the controller 31 fits the line, in some embodiments, the fit may be performed manually (guided by the eyes of the log analyst). In the example illustrated in the graph 67 of FIG. 7, the controller 31 fits the linear function with a scripted fitting routine which produces a slope and offset. The controller 31 analyzes the cloud of data, takes its statistical precision into account, and attempts to find a better fit for the environmental dependences of the minimum yield values. Having derived a function suitable for the aggregate dataset, the controller 31 applies the function as a correction to the geologic formation yields at each measurement point in the well. For example, the fitted function in the graph 67 in FIG. 7 has the form:

$$g(D_{BH}) = \delta + m(D_{BH} - BS) \quad (6)$$

where BS=8.50 is the nominal borehole bit size extracted from the dataset, $\delta$ is a constant offset for the organic carbon yield at the nominal bit size, and m is the slope of the borehole-size correction that accounts for the presence of organic carbon in the oil-based mud. In this data, the coefficients $\delta$ and m are fitted to have values of approximately 0.03619 and 0.01134, respectively, where the borehole diameter is measured in inches. The depth-level-by-level borehole correction can then be applied to the formation organic carbon yield:

$$Y_i^{formation} = Y_i^{total} - g(D_{BH}) \quad (7)$$

where element i represents organic carbon. The resulting organic carbon yield may be converted into the weight concentration of TOC in the geologic formation 21.

What may be of particular interest is that the above-described method may find a more accurate borehole-size dependence even if this well had been drilled with a different mud system whose oil-fraction were larger or smaller. The function g of equation 6 would be fitted with different values for the coefficients $\delta$ and m. This method of environmental correction may thus be considered "self-calibrating" for the carbon content of the mud.

While borehole size has been described as one particular environmental correction, it will be appreciated that the method described herein is equally applicable to any aspect of the environment that can change the spectral contribution of an element in the borehole 11. For example, as described above with respect to the pure-modeling algorithm, other prominent environmental factors for borehole elemental yields are tool stand-off and formation hydrogen index, for example. Of course other environmental factors may be considered.

As will be appreciated by those skilled in the art, it may be increasingly likely that there is some zone in the well interval that has zero organic carbon, but there cannot be a negative amount of carbon, so the constant offset is chosen to produce the minimum total organic carbon in the well which is statistically consistent with zero. The methods described herein apply the very same criteria for finding the constant offset $\delta$, and incorporate the additional environmental corrections. However, it should be noted that even if level-by-level environmental corrections were not made (i.e., apply a constant offset as in the method corresponding to equation 3), the method described herein allows a fit of the constant offset.

Figure 8:
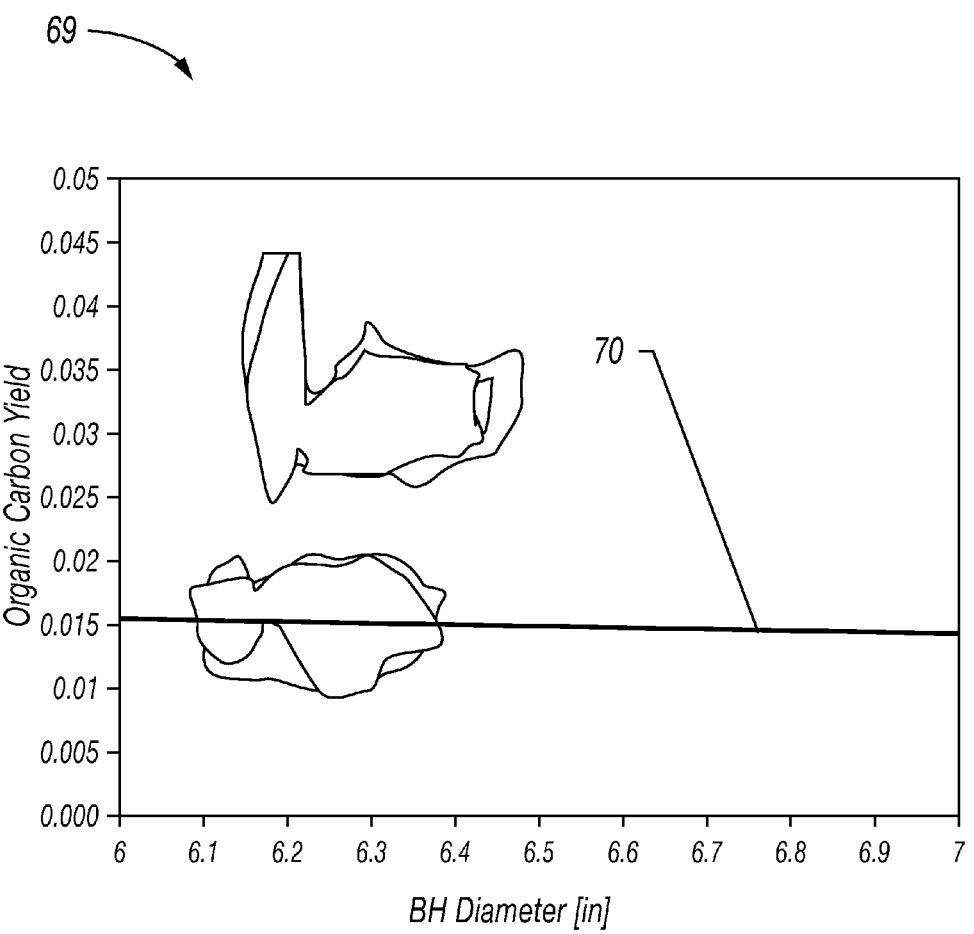
FIG. 8 is another graph correlating borehole diameter to organic carbon yield in accordance with an embodiment.

The use of water-based mud is an application where the environmental corrections may be less influential (although not necessarily zero) for borehole carbon, but it is still highly desirable that a relatively constant amount of tool background carbon be removed. The graph 69 in FIG. 8 is an example of the automatic fitting method where the oil-filled borehole is in a relatively good condition, so the fitted slope of the line 70 with a varying borehole diameter is effectively zero, but the constant offset is produced automatically.

Figure 9:
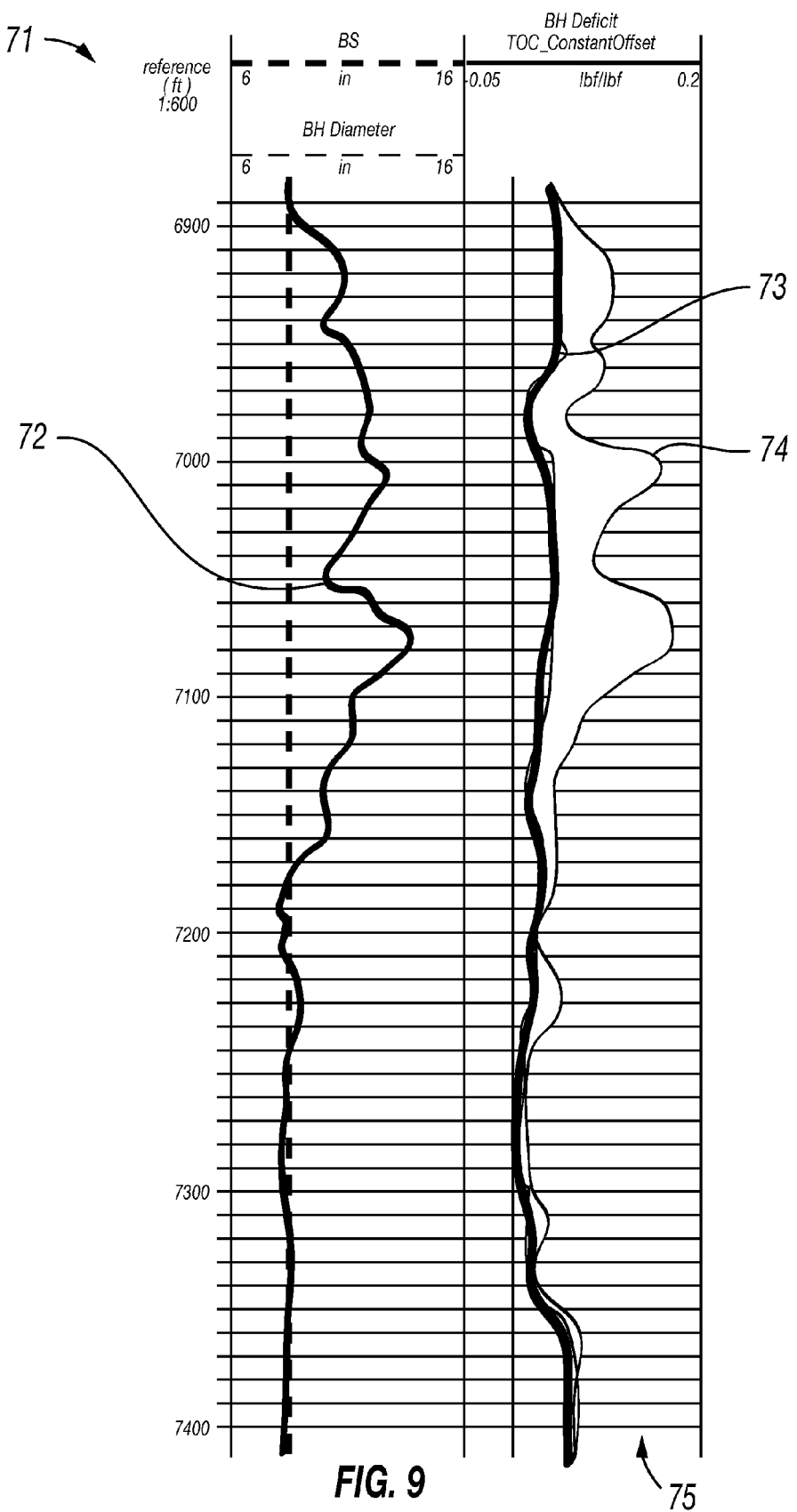
FIG. 9 is a graph illustrating the effect of borehole correction on the total organic carbon of the geologic formation in accordance with an embodiment.

The example of the self-calibrating correction for borehole carbon may be applied as a first pass at a correction to the formation total organic carbon (TOC) produced by the Litho Scanner™ spectroscopy service, for example. The graph 71 in FIG. 9, for example, illustrates an example of the effect of the automatic borehole correction on the formation TOC in a well drilled with oil-based mud. The left track 72 shows the circular borehole diameter and how it is enlarged from the nominal bit size in the upper portions of the well. The right track 75 compares the newly corrected formation TOC 73 against the TOC produced by the prior art conventional method of a constant offset pick 74. Using the conventional method, the increased carbon yield of an enlarged borehole produces an apparent TOC which is erroneously high. The self-calibrating correction method according to the embodiments described herein may be applied for any other element of the mud as well, as will be appreciated by those skilled in the art.

An increasingly desirable feature of the embodiment described above is that it is self-calibrated in the well of interest, automatically accounting for the mud composition, and more particularly, for the carbon content of the mud, for example. The data for the organic carbon yield typically shows a increasingly large dependence on borehole size when oil-based mud is present. However, it may statistically challenging to use this empirical method to extract the relationship between the carbon yield and other aspects of the environment whose impact on the borehole contribution is less dramatic, for example.

Nevertheless, other aspects of the environment affect the borehole contribution, and an appealing feature of using a modeling-derived algorithm, for example is that the method described herein accounts for these other aspects. A more complete correction algorithm may provide a more accurate measurement of organic carbon in the geologic formation 21 (or other element). One potential difficulty of the pure modeling algorithm, however, is that the carbon content of different mud systems is quite variable from well-to-well.

The benefits of the self-calibrating empirical correction may be combined with the benefits of modeling by using the fitted coefficients of the empirical correction to normalize an algorithm derived from modeling, for example. The empirically fitted coefficients (such as, for example, in equation 6) in the well of interest may provide valuable information on the mud's carbon content, and the coefficients may be used to adjust the parameters of the modeling algorithm to calibrate for the well of interest.

The modeling-derived algorithm of equation 4, for example, provides a relatively good example where the normalization or calibration of the modeling algorithm using the empirical fit can be accomplished in various ways. One approach is to take the ratio r of the empirically fitted slope m and the modeling-derived slope $c_2$ $$r = m/c2 \qquad (8)$$

and then re-assign the values of the coefficients from modeling according to $$c_i \to c_i * r \qquad (9)$$

for the subset of coefficients $\{c_1, c_2, c_3, c_4, c_6\}$ from equation 4 and Table 1. This procedure calibrates the modeling coefficients that explicitly depend on the carbon content of the mud. If desired, the constant offset $c_1$ may be set to agree with the empirically fitted value $\delta$. Various, more complex calibration procedures are also possible, as will be appreciated by those skilled in the art.

The newly calibrated correction function, a hybrid of the empirical data and computer modeling, may be applied as a more complete correction to the geologic formation organic carbon yield as in the format of equation 5, using measurements of borehole diameter, tool stand-off, and geologic formation hydrogen index as inputs to the correction function at each depth. This technique of incorporating a modeling algorithm with self-calibrating empirical data may be applied for any other element of the mud as will be appreciated by those skilled in the art.

Example applications and implications of the above-described methods and system may include gamma-ray spectroscopy measurement (e.g., wireline or LWD, chemical or electronic source of neutrons, inelastic, capture, or combined spectral information, and/or cased hole or open hole). Additionally, all or part of the measured dataset may be to examine the correlation of relative yields at each depth versus some measured aspect of the environment, for any element (e.g., carbon from OBM, K from KCl, Na from NaCl, any element from solid weighting agents: Si, Ca, Fe, S, C . . . ), and any environmental measurement or plurality of elements (e.g., any measurement of BH size or area, tool stand-off from the geologic formation, geologic formation porosity or hydrogen index, the density and composition of the borehole fluid, and the salinity of the borehole and geologic formation fluids).

All or part of the measured dataset may also be used to infer the borehole contribution to the total yield for that element at each depth where this borehole yield can be treated as a constant offset, where it can be a suitable function depending on one or more of the measured environmental aspects, or where the functional parameters of the borehole contribution can be extracted automatically through software and fitting algorithms. All or part of the measured dataset in the well may also be used to infer the borehole contribution to the total yield for that element at each depth where the functional parameters can be chosen manually by a log analyst, where the borehole contribution and its functional form can be taken from purely empirical correlations in the dataset, or where the empirical correlations in the data can be used to calibrate all or part of an existing algorithm based on computer modeling of the borehole contribution.

All or part of the measured dataset in the well may also be used to infer the borehole contribution to the total yield for that element at each depth also where the results of previous computer modeling or log analysis can be used to set boundaries on the allowed values extracted from the empirical data. Additionally, the borehole contribution for an element at each depth may be used to compensate its total yield to arrive at its formation yield at each depth.

Additionally, all or part of the measured data may be used to make the same borehole correction variations as above, but where they are derived exclusively from computer modeling, The same borehole correction variations as above may also be made based upon all or part of the measured data, but where they are derived exclusively from laboratory measurements. However, these latter two approaches may not account for well-to-well variations in the content of drilling fluids. The empirical extraction and the optional modeling calibration overcome that drawback.

Another aspect is directed to a non-transitory computer-readable medium for analyzing a geologic formation 21 that has computer-executable instructions configured to perform operations that may include determining each value of a given element in an adjacent portion of the geologic formation based upon a total value collected for the given element from a tool 100 operated within the borehole 11 at different depths in the borehole and corresponding borehole dimensions collected from the tool at the different depths in the borehole. Each total value may be based upon both a value for an adjacent portion of the geologic formation 21 and a value for material within the borehole 11. Of course, the computer-executable instructions may also include other additional instructions for performing other and/or additional operations.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method of analyzing a geologic formation having a borehole therein comprising:

operating at least one tool within the borehole to:
collect borehole dimensions at a plurality of different depths in the borehole, and collect a total value of a given element at each of the plurality of different depths, wherein the total value comprises a first value associated with the geologic formation adjacent the tool and a second value associated with material within the borehole adjacent the tool;

determining, using a controller, a borehole material offset function based at least in part on the borehole dimensions and the total value of the given element at each of the plurality of different depths; and determining, using the controller, a value of the given element in a portion of the geologic formation adjacent the tool at a particular depth in the borehole based at least in part upon the borehole material offset function.

2. The method of claim 1, wherein determining the value of the given element at the particular depth comprises:

determining a total value of the given element at the particular depth;

determining a borehole material offset by inputting borehole dimensions at the particular depth into the borehole material offset function; and subtracting the borehole material offset from the total value of the given element at the particular depth.

3. The method of claim 1, wherein the given element comprises at least one of carbon, potassium, sodium, silicon, calcium, iron, and sulfur.

4. The method of claim 1, wherein the borehole offset function comprises a constant offset associated with a nominal drill bit size and a correction offset associated with drill bit sizes larger than the nominal drill bit size.

5. The method of claim 1, wherein determining the borehole offset function comprises empirically determining the borehole offset function based upon curve fitting the collected borehole dimensions and total values at each of the plurality of different depths.

6. The method of claim 1, wherein collecting the total values at each of the plurality of different depths comprises performing an inelastic measurements at each of the plurality of different depths.

7. The method of claim 1, wherein determining the value of the given element in the portion of the geologic formation adjacent the tool at the particular depth is further based upon at least one other property.

8. The method of claim 7, wherein the at least one other property comprises at least one of a temperature, a pressure, a hydrogen index, a tool stand-off, a porosity, a density, a macroscopic thermal neutron capture cross-section (sigma), a mud compressibility, and a mud composition.

9. The method of claim 1, wherein the material within the borehole comprises at least one of drilling mud, geologic formation fragments, water, and oil.

10. A system for analyzing a geologic formation having a borehole therein comprising:

at least one tool configured to be operated within the borehole to:

collect borehole dimensions at a plurality of different depths in the borehole, and collect a total value of a given element at each of the plurality of different depths, wherein the total value comprises a first value associated with geologic formations adjacent the tool and a second value associated with material within the borehole adjacent the tool; and a controller configured to:

determine a borehole material offset function based at least in part on the borehole dimensions and the total value of the given element at each of the plurality of different depths; and determine a value of the given element in a portion of the geologic formation adjacent the tool at a particular depth in the borehole based at least in part upon the borehole material offset function.

11. The system of claim 10, wherein the controller is configured to determine the value of the given element at the particular depth by:

determining a total value of the given element at the particular depth;

determining a borehole material offset by inputting borehole dimensions at the particular depth into the borehole material offset function; and subtracting the borehole material offset from the total value of the given element at the particular depth.

12. The system of claim 10, wherein the given element comprises at least one of carbon, potassium, sodium, silicon, calcium, iron, and sulfur.

13. The system of claim 10, wherein the borehole offset function comprises a constant offset associated with a nominal drill bit size and a correction offset associated with drill bit sizes larger than the nominal drill bit size.

14. The system of claim 10, wherein determining the borehole offset function comprises empirically determining the borehole offset function based upon curve fitting the collected borehole dimensions and total values at each of the plurality of different depths.

15. The system of claim 10, wherein determining the value of the given element in the portion of the geologic formation adjacent the tool at the particular depth is further based upon at least one other property.

16. The system of claim 15, wherein the at least one other property comprises at least one of a temperature, a pressure, a hydrogen index, a tool stand-off, a porosity, a density, a macroscopic thermal neutron capture cross-section (sigma), a mud compressibility, and a mud composition.

17. A tangible non-transitory computer readable medium configured to store instructions executable by a controller, wherein the instructions comprise instructions to:

instruct, using the controller, a tool operating within a borehole to:

collect borehole dimensions at a plurality of different depths in the borehole; and collect a total value of a given element at each of the plurality of different depths, wherein the total value comprises a first value associated with geologic formations adjacent the tool and a second value associated with material within the borehole adjacent the tool;

determine, using the controller, a borehole material offset function based at least in part on the borehole dimensions and the total value of the given element at each of the plurality of different depths; and determine, using the controller, a value of the given element in a portion of the geologic formation adjacent the tool at a particular depth in the borehole based at least in part upon the borehole material offset function.

18. The computer readable medium of claim 17, wherein the instructions to determine the value of the given element comprises instructions to:

determine a total value of the given element at the particular depth;

determine a borehole material offset by inputting borehole dimensions at the particular depth into the borehole material offset function; and subtract the borehole material offset from the total value of the given element at the particular depth.

19. The computer readable medium of claim 17, wherein the borehole offset function comprises a constant offset associated with a nominal drill bit size and a correction offset associated with drill bit sizes larger than the nominal drill bit size.

20. The computer readable medium of claim 17, wherein the instructions to determine the borehole offset function comprises instructions to empirically determine the borehole offset function based upon curve fitting the collected borehole dimensions and total values at each of the plurality of different depths.

* * * * *